Patented Oct. 9, 1923.

1,470,554

UNITED STATES PATENT OFFICE.

AUGUSTUS EDWARD CRAVER, OF BUFFALO, NEW YORK, ASSIGNOR TO THE BARRETT COMPANY, A CORPORATION OF NEW JERSEY.

DYESTUFF PREPARED FROM ORTHOXYLYLALDEHYDE.

No Drawing.   Application filed October 30, 1922.   Serial No. 598,021.

*To all whom it may concern:*

Be it known that I, AUGUSTUS E. CRAVER, a citizen of the United States, residing at Buffalo, in the county of Erie and State of New York, have invented certain new and useful Improvements in Dyestuffs Prepared from Orthoxylylaldehyde, of which the following is a specification.

It is well known that the condensation of benzaldehyde or derivatives thereof with aromatic secondary or tertiary amines or derivatives thereof yield in many cases leuco compounds of valuable dyestuffs of the triphenylmethane series, the properties of which dyestuffs depend upon the composition and constitution of the intermediates used.

The present invention is based on the discovery that new and valuable dyestuffs can be obtained by the condensation of orthoxylylaldehyde mono or disulfonic acid with secondary or tertiary aromatic amines and subsequently oxidizing the leuco compound, resulting from the condensation, to the color base. These new triphenylmethane dyestuffs are of particular value in dyeing unmordanted silk and wool, and occasionally for dyeing mordanted silk and wool, blue to green shades. The dyed fabrics or other materials dyed with these new dyestuffs also form part of the present invention.

The new dyestuffs can be obtained by oxidation in acid solution of leuco bases of the triphenylmethane series having the following formula:

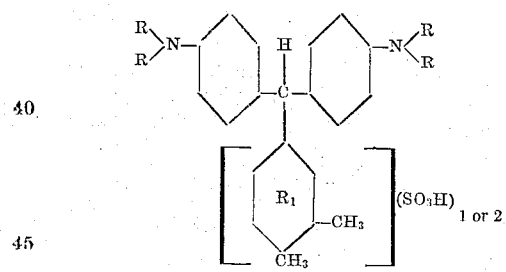

wherein R denotes hydrogen, alkyl, aryl, alkaryl or aralkyl groups which may or may not be substituted (e. g., $-CH_3, -C_2H_5,$ $-C_6H_5, -C_6H_4CH_3, -CH_2C_6H_5, -CH_2C_6H_4SO_3H,$ etc.) and wherein said groups R are substituents of an amino group attached to an aromatic nucleus which of itself may or may not contain other substituents; and wherein $R_1$ represents a benzene nucleus which contains two substituting methyl groups, one in the meta and one in the para positions respectively to the methane carbon atom, and which benzene nucleus also contains either one or two substituting sulfonic acid groups, depending on whether orthoxylylaldehyde mono or disulfonic acid is used in the condensation.

The starting materials for these new dyestuffs is orthoxylylaldehyde, i. e., dimethylbenzaldehyde $(CHO:CH_3:CH_3=1:3:4)$ which can be obtained for instance by the catalytic oxidation of pseudo-cumene as described in my co-pending applications, Serial Nos. 514,903 and 516,124 filed November 4th, 1921, and November 18th, 1921, respectively, and which I have found can be readily converted into mono and disulfonic acid derivatives.

Orthoxylylaldehyde monosulfonic acid can be prepared as follows:

20 parts by volume of orthoxylylaldehyde are gradually added to 100 parts by volume of fuming sulfuric acid containing 63% free sulfur trioxide, maintaining the temperature of the liquid at 0–5° C. After the aldehyde has all been added, the mixture, while being maintained at this temperature, is agitated for about one hour or until a sample of the liquid indicates no unchanged aldehyde as shown by its complete solubility in water. The mass is then introduced into a large quantity of cold water (two to three liters), and neutralized with milk of lime. The precipitated calcium sulfate is filtered off and washed. The filtrate contains the calcium salt of the mono-sulfonic acid of orthoxylylaldehyde. The free acid is then liberated by adding just enough sulfuric acid to precipitate as calcium sulfate the calcium in the calcium sulfonate. The precipitated calcium sulfate is filtered off and the filtrate evaporated to dryness and the orthoxylylaldehyde monosulfonic acid is thus obtained as a white crystalline mass. Under the above conditions of sulfonation, I have been able to obtain a yield of about 90% of theory of the monosulfonic acid.

By changing the conditions of the sulfonation, I have been able to introduce two sulfonic acid groups into orthoxylylaldehyde. To this end 20 parts by volume of orthoxylylaldehyde are gradually added to 160 parts by volume of fuming sulfuric acid containing 63% free sulfur trioxide maintained at a temperature of 80° C. The mass is then held at 80° C. for about 20 hours while being stirred, after which the temperature is gradually raised to about 150° C. during a period of two hours. The mass is allowed to cool, after which it is introduced into about two to three liters of cold water and neutralized with barium carbonate or milk of lime. The insoluble barium or calcium sulfate which thus precipitates is filtered off and washed. Just sufficient sulfuric acid is then added to the filtrate, which contains the barium or calcium disulfonate or orthoxylylaldehyde (depending on whether barium carbonate or milk of lime is used to neutralize the sulfonation mass), to completely precipitate the barium or calcium present. The filtrate, after the precipitate of barium or calcium sulfate has been filtered off, is then evaporated to dryness and the orthoxylylaldehyde disulfonic acid obtained as a white crystalline mass. The barium salt of the acid forms white needles on crystallization from water and is somewhat less soluble than the corresponding calcium or sodium salt. Under the above conditions of sulfonation, I have been able to obtain a yield of about 70% of theory of the disulfonic acid derivative of orthoxylylaldehyde.

I have employed both the mono and disulfonic acid derivatives of orthoxylylaldehyde in producing new triphenylmethane dyestuffs of which this is a specification. The following example will serve to illustrate the procedure which I have used in producing the new dyestuffs. The parts are by weight.

500 parts of an aqueous solution containing 10% orthoxylylaldehyde monosulfonic acid are boiled with 63 parts of dimethylaniline and 6.0 parts of sulfuric acid for 15 hours. Sodium carbonate is then added to the solution until a faint alkalinity is reached and the dimethylaniline which has remained unacted upon is distilled off in a current of steam. The residual solution is diluted with water to about ten times its volume, acidulated by the addition of hydrochloric or acetic acid and the leuco base thus formed is then oxidized by means of the desired quantity of lead peroxide, as for instance, 200 parts of a 30% paste of lead peroxide. When the oxidation is complete, there is added a concentrated solution of sodium sulfate in an amount sufficient to precipitate the lead salt as lead sulfate, the solution is filtered from the lead sulfate, and the filtrate which has been made alkaline by the addition of ammonia, is evaporated to dryness and the dyestuff thus recovered. The dyestuff thus obtained from the orthoxylylaldehyde monosulfonic acid forms a copper like powder readily dissolving in cold and hot water with a greenish blue color. The addition of sodium hydroxide or acetic does not change its color. It dyes silk and wool in an acid bath bluish green shades, considerably bluer than the shades produced by ordinary malachite green; and the dyestuff is further distinguished by its relatively great fastness to alkalis, light and washing.

By starting out with an equivalent quantity of orthoxylylaldehyde disulfonic acid and using a procedure similar to that described above for the monosulfonic acid derivative, a dyestuff is obtained which has properties similar to that derived from the monosulfonic acid derivative, and I have found that it has dyeing properties closely agreeing with those of the mono derivative.

The condensation of the new sulfonic acid derivatives of orthoxylylaldehyde with aromatic amines or derivatives thereof, may be effected, and the dyestuffs isolated by ordinary methods employed in the condensation of similar compounds.

Analogous leuco compounds and their corresponding oxidation products as dyestuffs may be produced by substituting in the above example for dimethylaniline, the equivalent quantity of other aromatic amines, e. g., diethylaniline, ethylbenzylaniline, ethylbenzylaniline sulfonic acid, monomethyl-o-toluidine, dimethyl-o-toluidine, and the like, or a mixture of equivalent quantities of various aromatic amines may be employed, as, for example, a mixture of one equivalent of dimethylaniline with one equivalent of ethylbenzylaniline sulfonic acid, etc.

Thus by starting out with orthoxylylaldehyde mono or disulfonic acid, I have been able to obtain triphenylmethane dyestuffs which are soluble in water and, in the form of a salt or as base, dye wool and silk, from an acid bath desirable blue to greenish shades which are fast to light, alkalis and washing.

In the claims it will be understood that the term "univalent substituents" includes univalent substituents which are alike or different and includes hydrogen and alkyl, aryl, aralkyl or alkaryl groups which may or may not be substituted such as, for example,— $CH_3$,— $C_2H_5$,— $C_6H_5$,— $C_6H_4CH_3$, — $CH_2C_6H_5$,— $CH_2C_6H_4SO_3H$, etc., that the term "aromatic nucleus" denotes and includes a benzene nucleus which may or may not otherwise contain substituents, such as methyl, halogen, hydroxyl, sulphonic acid groups, that the term "orthoxylylaldehyde sulfonic acid" includes the mono and disulfonic acid, and that the term "dyestuff" or "dyestuffs" included the base or salts of the base.

I claim:

1. As new products, the dyestuffs derived, by oxidation and separation, from leuco compounds having the following probable general formula:

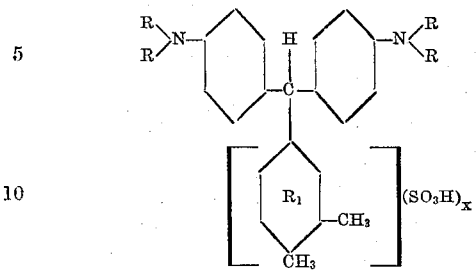

wherein R denotes univalent substituents in an amino group which is attached to an aromatic nucleus, and wherein $R_1$ represents a benzene nucleus containing two methyl groups as substituents in the meta and para positions respectively to the methane carbon atom and wherein X denotes a whole number whose numerical value is at least equal to one and not more than two, said leuco compounds being obtainable by condensing one mol of orthoxylylaldehyde sulfonic acid with two mols of N-substituted aromatic amines of the benzene series, and said dyestuffs dyeing unmordanted silk and wool, as well as other materials, blue to green shades.

2. As a new product, the leuco compound of the triphenylmethane series obtainable by condensing one mol of orthoxylylaldehyde sulfonic acid with two mols of dimethylaniline and having the following probable formula:

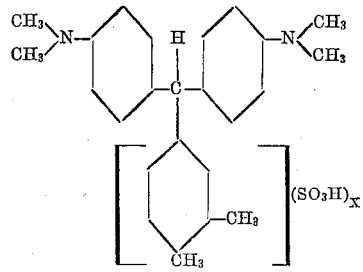

wherein X denotes a whole number whose numerical value is at least equal to one and not more than two.

3. As a new product, the dyestuff of the triphenylmethane series obtainable by the oxidation of the leuco compound of claim 2, which dyestuff forms a copper-like powder, readily soluble in cold and hot water and in alcohol with a bluish green color and dyes unmordanted silk and wool, and also mordanted silk and wool as well as other materials bluish green shades.

4. Materials dyed with the new dyestuffs of claim 1.

5. Materials dyed with the new dyestuff of claim 3.

In testimony whereof I affix my signature.

AUGUSTUS EDWARD CRAVER.